United States Patent
Cahill, Jr.

(10) Patent No.: US 10,731,604 B2
(45) Date of Patent: Aug. 4, 2020

(54) ROCKET MOTOR WITH CONCENTRIC PROPELLANT STRUCTURES FOR SHOCK MITIGATION

(71) Applicant: Aerojet Rocketdyne, Inc., Sacramento, CA (US)

(72) Inventor: Peter J. Cahill, Jr., Gainesville, VA (US)

(73) Assignee: Aerojet Rocketdyne, Inc., Huntsville, AL (US)

(*) Notice: Subject to any disclaimer, the term of this patent is extended or adjusted under 35 U.S.C. 154(b) by 772 days.

(21) Appl. No.: 15/221,638

(22) Filed: Jul. 28, 2016

(65) Prior Publication Data

US 2018/0094606 A1    Apr. 5, 2018

Related U.S. Application Data

(60) Provisional application No. 62/204,827, filed on Aug. 13, 2015.

(51) Int. Cl.
| | | |
|---|---|---|
| *F02K 9/38* | (2006.01) | |
| *F02K 9/08* | (2006.01) | |
| *F02K 9/28* | (2006.01) | |
| *F02K 9/12* | (2006.01) | |
| *C06B 25/34* | (2006.01) | |
| *C06B 23/00* | (2006.01) | |
| *C06B 25/30* | (2006.01) | |
| *C06B 45/12* | (2006.01) | |
| *C06B 45/10* | (2006.01) | |
| *F02K 9/10* | (2006.01) | |
| *F02K 9/26* | (2006.01) | |

(Continued)

(52) U.S. Cl.
CPC .............. *F02K 9/28* (2013.01); *C06B 23/001* (2013.01); *C06B 23/006* (2013.01); *C06B 25/30* (2013.01); *C06B 25/34* (2013.01); *C06B 45/105* (2013.01); *C06B 45/12* (2013.01); *F02K 9/08* (2013.01); *F02K 9/10* (2013.01); *F02K 9/12* (2013.01); *F02K 9/14* (2013.01); *F02K 9/18* (2013.01); *F02K 9/26* (2013.01); *F02K 9/38* (2013.01)

(58) Field of Classification Search
CPC ... B64G 1/403; F02K 9/08; F02K 9/10; F02K 9/12; F02K 9/14; F02K 9/18; F02K 9/26; F02K 9/28; F02K 9/38
See application file for complete search history.

(56) References Cited

U.S. PATENT DOCUMENTS

| | | | | |
|---|---|---|---|---|
| 3,555,958 A | * | 1/1971 | Leasure, Jr. | ........... F02K 9/12 86/1.1 |
| 3,945,202 A | * | 3/1976 | Marion | .................. C06B 29/00 60/253 |

(Continued)

OTHER PUBLICATIONS

Brian Dunbar, J-2X Extra: The Rocket Engine Development Life Cycle, Jun. 20, 2011, NASA.*

(Continued)

*Primary Examiner* — Todd E Manahan
*Assistant Examiner* — Kyle Robert Thomas

(57) ABSTRACT

A solid rocket motor includes a first solid propellant and a second solid propellant at least partially surrounding the first solid propellant. The second solid propellant is resistant to fragment impact and the first solid propellant has a higher impulse than the second solid propellant.

8 Claims, 1 Drawing Sheet

(51) Int. Cl.
*F02K 9/14* (2006.01)
*F02K 9/18* (2006.01)

(56) References Cited

U.S. PATENT DOCUMENTS

| | | | | |
|---|---|---|---|---|
| 4,223,606 | A * | 9/1980 | Bornstein | F02K 9/12 |
| | | | | 102/374 |
| 5,714,711 | A * | 2/1998 | Schumacher | C06B 45/12 |
| | | | | 102/289 |
| 6,024,810 | A * | 2/2000 | Neidert | C06B 21/0025 |
| | | | | 149/100 |
| 7,896,989 | B1 * | 3/2011 | Fair | C06B 21/0008 |
| | | | | 149/109.4 |
| 2002/0166612 | A1 * | 11/2002 | Chan | C06B 45/02 |
| | | | | 149/19.4 |
| 2013/0048163 | A1 * | 2/2013 | Hafner | C06B 25/24 |
| | | | | 149/6 |
| 2015/0284301 | A1 * | 10/2015 | Durand | F42B 5/16 |
| | | | | 264/3.3 |

OTHER PUBLICATIONS

Department of Defense, MIL-STD-2105D—Hazard Assessment Tests for Non-Nuclear Munitions, Apr. 19, 2011, Department of Defense.*

North Atlantic Treaty Organization, STANAG 4496—Fragment Impact, Munitions Test Procedure, Dec. 13, 2006, North Atlantic Treaty Organization.*

* cited by examiner

ROCKET MOTOR WITH CONCENTRIC PROPELLANT STRUCTURES FOR SHOCK MITIGATION

CROSS-REFERENCE TO RELATED APPLICATIONS

The present disclosure claims priority to U.S. Provisional Patent Application No. 62/204,827, filed Aug. 13, 2015.

BACKGROUND

Solid rocket motors typically include a cast solid propellant material. Ignition of the solid propellant generates high pressure gas, which is expelled through a nozzle to generate thrust.

SUMMARY

A solid rocket motor according to an example of the present disclosure includes a first solid propellant and a second solid propellant that at least partially surrounds the first solid propellant. The second solid propellant is resistant to fragment impact and the first solid propellant has a higher impulse than the second solid propellant.

In a further embodiment of any of the foregoing embodiments, the impulse is specific impulse, and the first solid propellant has higher specific impulse than the second solid propellant by at least 5%.

In a further embodiment of any of the foregoing embodiments, the rocket motor has a diameter, and the second solid propellant has a total diametric thickness, as a percentage of the diameter, of greater than about 5%.

In a further embodiment of any of the foregoing embodiments, the total diametric thickness is less than about 20%.

In a further embodiment of any of the foregoing embodiments, the first solid propellant includes nitramine solid oxidizer and the second solid propellant excludes any nitramine solid oxidizer.

In a further embodiment of any of the foregoing embodiments, the first solid propellant has, by weight, greater than about 12% of the nitramine solid oxidizer.

In a further embodiment of any of the foregoing embodiments, the first solid propellant and the second solid propellant have a common binder system with one or more common binder constituents.

In a further embodiment of any of the foregoing embodiments, the first solid propellant and the second solid propellant have one or more common binder constituent amounts by weight of, respectively, the one or more common binder constituents.

In a further embodiment of any of the foregoing embodiments, the first solid propellant and the second solid propellant have, by weight, a common binder system amount of the common binder system.

A further embodiment of any of the foregoing embodiments includes a migration barrier between the first solid propellant and the second solid propellant.

In a further embodiment of any of the foregoing embodiments, the migration barrier includes a polymeric layer or a metallic layer.

In a further embodiment of any of the foregoing embodiments, the first solid propellant has a specific impulse of at least about 15 lb·s/in3 (pound-seconds per cubic inch).

In a further embodiment of any of the foregoing embodiments, the second solid propellant is resistant to fragment impact according to MIL-STD-2105D and NATO STANAG 4496.

A further embodiment of any of the foregoing embodiments includes a motor case in which the first solid propellant and the second solid propellant are disposed, and a nozzle disposed at one end of the motor case.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
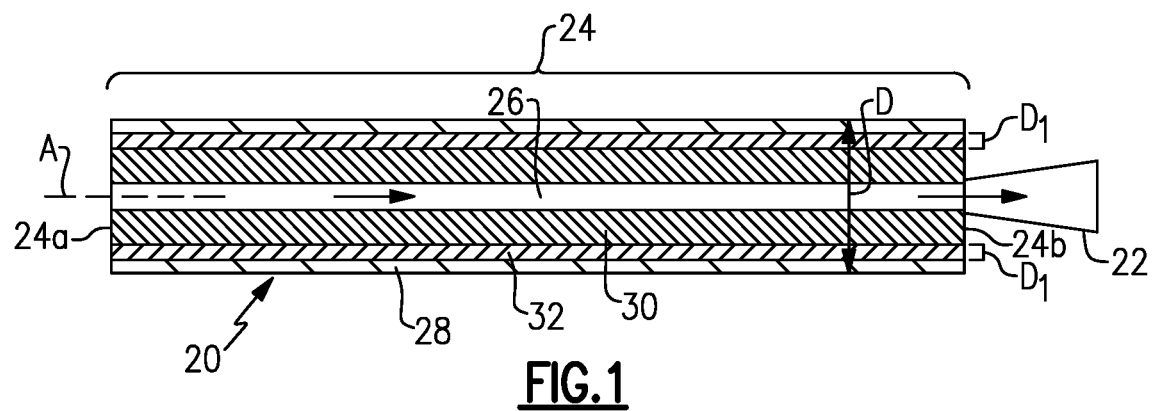
FIG. 1 illustrates an example solid rocket motor that includes first and second solid propellants, and the second solid propellant is resistant to fragment impact and the first solid propellant has a higher impulse than the second solid propellant.

FIG. 1 schematically illustrates a cross-section of selected portions of an example solid rocket motor 20, which may contain minimum signature (smokeless) solid propellants. The solid rocket motor 20 generally includes a nozzle 22 and a solid propellant section 24. The solid propellant section 24 includes a forward end 24a and an aft end 24b. The aft end 24b is in communication with the nozzle 22. As will be appreciated, the solid rocket motor 20 may include additional components related to the operation thereof, which are generally known and thus not described herein.

The solid propellant section 24 defines an elongated bore 26. The geometry of the bore 26 may be cylindrical and may have radial fin slots or other features. Alternatively, the solid propellant section 24 may not have a bore. The solid propellant section 24 is generally disposed within a motor case 28 about a central axis A.

Upon ignition the solid propellant section 24 reacts to produce high temperature and high pressure gas (combustion gas). The combustion gas flows down the bore 26 and discharges through the nozzle 22 to produce thrust.

High impulse energy solid propellants, especially minimum signature (smokeless) solid propellants, typically have high sensitivity to shock and are unable to meet fragment impact resistance, such as fragment impact of an 18.6 gram carbon-steel fragment at 8300 ft./s. Standards for such resistance include MIL-STD-2105D and NATO STANAG 4496. High impulse energy solid propellants have thus been precluded from use where such fragment impact resistance is required. In order to meet fragment impact resistance a typical rocket motor utilizes a lower impulse energy solid propellant that is less sensitive to shock and impact. However, lower impulse energy solid propellant sacrifices overall motor impulse performance.

To obtain enhanced performance and also meet fragment impact resistance with minimum signature (smokeless) solid propellants, the solid propellant section 24 includes two (or more) solid propellant materials that are synergistically arranged in the solid propellant section 24. A first solid propellant 30 is arranged about the axis A and a second solid propellant 32 at least partially surrounds the first solid propellant 30. As an example, the first solid propellant 30 is arranged about the axis A as an inner structure and the second solid propellant 32 is arranged as an outer structure that encompasses the first solid propellant 30 or inner structure. In some examples the first and second solid propellants 30/32 are thus concentric about the axis A.

The second solid propellant 32 of the outer structure is resistant to fragment impact and the first solid propellant 30 of the inner structure has a higher impulse than the second solid propellant 32. The fragment impact resistant second solid propellant 32 shields the first solid propellant 30 from direct impact by an external impact body (e.g., a fragment). The second solid propellant 32 thus serves as a shock barrier that slows the impact body and reduces the pressure of the shock wave caused by the impact body. The first solid propellant 30 can thus withstand the impact without detonating. In one example, the second solid propellant 32 is resistant to fragment impact according to MIL-STD-2105D and NATO STANAG 4496 and the first solid propellant 30 is non-resistant to fragment impact according to MIL-STD-2105D and NATO STANAG 4496.

The shock barrier provided by the second solid propellant 32 thereby enables a higher impulse propellant to be used as the first solid propellant 30, to enhance overall performance of the rocket motor 20. For example, the impulse is specific impulse, and the first solid propellant 30 has higher specific impulse than the second solid propellant 32 by at least 5%. In further examples, the first solid propellant 30 has higher specific impulse than the second solid propellant 32 by at least 10%. The first and second propellants 30/32 thus cooperate to provide overall fragment impact resistance of the rocket motor 20 with enhanced overall performance in comparison to motors that utilize only low impulse solid propellant to meet fragment impact resistance.

In further examples, the geometry of the second solid propellant 32 can be changed to vary the level of effectiveness of the second solid propellant 32 as a shock barrier. For example, the motor 20 has a diameter (represented at D) and the second solid propellant 32 has a total diametric thickness (represented at D1) as a percentage of the diameter D that is greater than about 5%. Below about 5% the level of effectiveness of second solid propellant 32 as a shock barrier diminishes and may not meet the resistance to fragment impact. In a further example, the total diametric thickness D1 is less than about 20% of the diameter D. Above about 20% the performance of the second solid propellant 32 may dominate such that there is only modest performance enhancement from the higher performance first solid propellant 30.

In further examples, the compositions of the first and second solid propellants 30/32 can be adapted in order to adjust the overall performance of the motor 20 and/or the aging durability of the motor 20 (e.g., when in storage). For example, the first solid propellant 30 has a density impulse of at least about 15 lb·s/in$^3$ (pound-seconds per cubic inch). In a further example, the first solid propellant 30 includes at least one nitramine solid oxidizer and the second solid propellant 32 excludes any nitramine solid oxidizer. Nitramine solid oxidizers are high-energy oxidizers. Thus, the nitramine solid oxidizer can be used in the first solid propellant 30 to boost the impulse performance. In one further example, the first solid propellant 30 has, by weight, greater than about 12% of the nitramine solid oxidizer. Example nitramine solid oxidizers may include, but are not limited to, cyclotetramethylene-tetranitramine (HMX), cyclomethylene trinitramine (RDX), and hexanitrohexaazaisowurtzitane (CL-20).

In further examples, the respective compositions of the first and second solid propellants 30/32 have one or more common constituents. A "constituent" is a distinct element or compound in a composition. For instance, the compositions of the propellants 30/32 have a common binder system of one or more common binder constituents. As an example, the one or more common binder constituents may be, but are not limited to, polycaprolactone, polyester, or a mixture of polycaprolactone and polyester. The polycaprolactone, the polyester, or the mixture of polycaprolactone and polyester is present in both compositions. Use of one or more common binder constituents facilitates the reduction in thermally-induced migration or diffusion of constituents between the propellants 30/32, which otherwise may have the potential to debit aging durability due to compositional changes over time from migration or diffusion.

The amount, by weight, of the common binder system in the compositions may be a common amount of the common binder system or an uncommon (different) amount of the common binder system. A common amount of the common binder system may be used to further facilitate the reduction in migration or diffusion of constituents between the propellants 30/32. For example, both compositions may include about 6% to about 12% of the common binder system. In a further example, the compositions have one or more common binder constituent amounts by weight. For example, the compositions may both include, by weight, about 4% to about 6% of the polyester, about 2% to about 4% of the polycaprolactone, or a mixture of about 6% to about 10% of polyester and polycaprolactone.

In further embodiments, the compositions of the propellants 30/32 include oxidizers, plasticizers, binders, curatives, burn rate modifiers, and stabilizers selected according to the examples below.

A. Solid Oxidizers:
A.1. First Solid Propellant:
cyclotetramethylenetetranitramine (HMX),
cyclotrimethylenetrinitramine (RDX), and/or
hexanitrohexaazaisowurtzitane (CL-20).
A.2. Second Solid Propellant:
nitrotriazolone (NTO),
1,4-dinitroglycoluril (DNGU),
1,1-diamino-2,2-dinitroethene (DADNE, FOX-7),
guanylurea-dinitramide (FOX-12),
triaminotrinitrobenzene (TATB), and/or
ammonium nitrate (AN).
B. Energetic Plasticizers:
B.1. Both First and Second Solid Propellants:
diethylene glycol dinitrate (DEGDN),
trimethylolethane trinitrate (TMETN),
1,2,4-butanetriol trinitrate (BTTN),
nitroglycerin (NG), and/or
triethylene glycol dinitrate (TEGDN).

In one example, the energetic plasticizer of both the first and second solid propellants 30/32 is a blend, by weight of the total amount of energetic plasticizers, of about 30% to about 70% of DEGDN and about 70% to about 30% of TMETN.

C. Polymeric Binders
C.1. Both First and Second Solid Propellants:
nitrocellulose,
polycaprolactone,
polyester,
polyurethane,
polyethylene glycol, and/or
polyethylene glycol adipate In one example, the polymeric binder of both the first and second solid propellants 30/32 is a blend of polycaprolactone and polyester.

D. Curatives:
D.1. Both First and Second Solid Propellants:
hexamethylene diisocyanate (HMDI),
isophorone diisocyanate (IPDI), and/or
dimeryl diisocyanate (DDI).
E. Burning rate modifiers
E.1. Both First and Second Solid Propellants:
flake aluminum,
lead citrate,
LC-12-15 (lead-copper complex of β-resorcylic acid and salicylic acid),
carbon, and/or
bismuth, tin, or copper compounds or organometallic complexes.

In one example, the burn rate modifier of both the first and second solid propellants 30/32 includes, by weight, less than 0.5% of flake aluminum and about 2% to about 5% of lead citrate.

F. Stablizers
F.1. Both First and Second Solid Propellants:
n-methylnitroanaline (MNA), and/or
nitrodiphenylamine (2-NDPA).

In a further example, the first solid propellant 30 has the composition of Table 1 below and the second solid propellant 32 has the composition of Table 2 below. In this example, the compositions are equivalent except that the first solid propellant 30 includes HMX and the second solid propellant 32 includes NTO in place of the HMX.

TABLE 1

Example composition of the first solid propellant material 30.
The "nominal wt %" is the target amount in the composition,
which may vary in an actual composition due to typical measuring
tolerances or, at least, within the full range of one further
decimal position of the last significant FIGURE.

| Constituent | Trade Name | Function | Nominal wt % |
|---|---|---|---|
| Flake Aluminum | Aluminum | Ballistic Modifier | ≤0.5% |
| Lead Citrate | Lead Citrate | Burn Rate Modifier | 2-5% |
| Cyclotetramethy-lenetetranitramine | HMX, <3 micron | Solid energetic/ gas generator | 45%-65% |
| Nitrocellulose | NC | Energetic Binder | 0-2% |
| Trimethylolethane trinitrate | TMETN | Energetic Plasticizer | 10-20% |
| Butanetriol trinitrate | BTTN | Energetic Plasticizer | 10-20% |
| R-18 Polyester | R-18 | Binder | 4-6% |
| Polycaprolactone | PCL | Binder | 2-4% |
| Nitrodiphenylamine | 2-NDPA | Stabilizer | 0.5%-1.0% |
| N-Methyl-P-Nitroaniline | MNA | Stabilizer | 0.5%-1.0% |
| Hexamethylene diisocyanate | HMDI | Curative | .5-2.0% |

TABLE 2

Example composition of the second solid propellant 32.

| Constituent | Trade Name | Function | Nominal wt % |
|---|---|---|---|
| Flake Aluminum | Aluminum | Ballistic Modifier | ≤0.5% |
| Lead Citrate | Lead Citrate | Burn Rate Modifier | 2-5% |
| Nitrotriazolone | NTO | Solid energetic/ gas generator | 45%-65% |
| Nitrocellulose | NC | Energetic Binder | 0-2% |
| Trimethylolethane trinitrate | TMETN | Energetic Plasticizer | 10-20% |
| Butanetriol trinitrate | BTTN | Energetic Plasticizer | 10-20% |
| R-18 Polyester | R-18 | Binder | 4-6% |
| Polycaprolactone | PCL | Binder | 2-4% |
| Nitrodiphenylamine | 2-NDPA | Stabilizer | 0.5%-1.0% |
| N-Methyl-P-Nitroaniline | MNA | Stabilizer | 0.5%-1.0% |
| Hexamethylene diisocyanate | HMDI | Curative | .5-2.0% |

Figure 2:
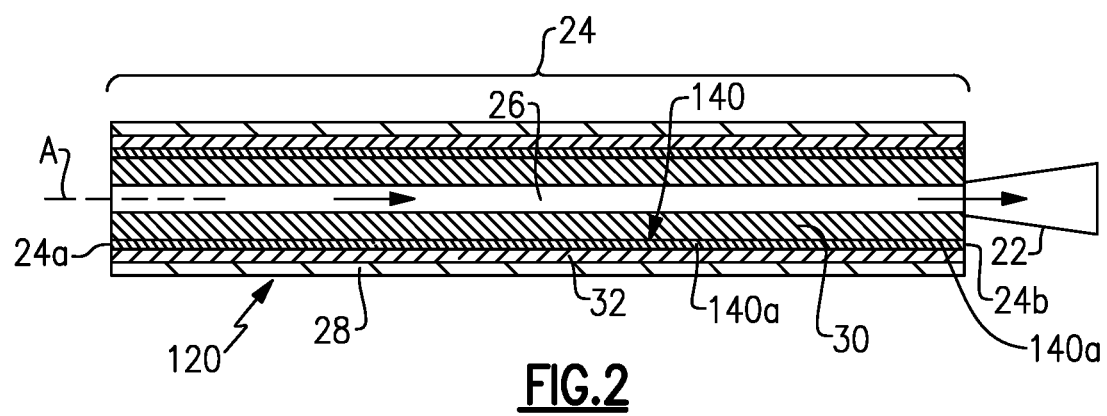
FIG. 2 illustrates another example solid rocket motor that has a migration barrier.

FIG. 2 illustrates another example of a rocket motor 120. The rocket motor 120 is the same as the rocket motor 20 described in the examples above but additionally includes a migration (or diffusion) barrier 140 between the first solid propellant 30 and the second solid propellant 32. The migration barrier 140 facilitates blocking migration or diffusion of constituents between the first solid propellant 30 and the second solid propellant 32, such as thermally-induced migration or diffusion.

In further embodiments, the migration barrier 140 may be or may include, but is not limited to, a polymeric layer or metallic layer (represented at 140a). An example polymeric layer may include a vinyl polymer. In a further example, the polymeric layer includes a solid filler, such as carbon. An example metallic layer may include aluminum. Aluminum and vinyl may serve a dual purpose as an additional energetic. The polymeric layer or the metallic layer 140a may be applied, by deposition, painting, or other suitable process, to the first solid propellant 30 prior to formation of the second solid propellant 32, for example.

The first solid propellant 30 may be fabricated using known casting techniques in which a composition according to the present disclosure is cast around a mandrel and then cured. After curing the mandrel may be removed. If the migration barrier 140 is used, the migration barrier is applied to the outside of the first solid propellant 30. The second solid propellant 32 may then be fabricated using known casting techniques in which a composition according to the present disclosure is cast between the first solid propellant 30 (or the migration barrier 140, if used) and the case 28. Of course, the process could be inversely conducted to first fabricate the second solid propellant 32, apply the migration barrier 140 (if used) to the inside of the second solid propellant 32, and then cast the first solid propellant 30 in the migration barrier 140.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A solid rocket motor comprising:

a first solid propellant and a second solid propellant at least partially surrounding the first solid propellant, wherein the second solid propellant is resistant to fragment impact and the first solid propellant has a higher impulse than the second solid propellant, wherein the rocket motor has a diameter, and the second solid propellant has a total diametric thickness, as a percentage of the diameter, of 5% to 20%, and the first solid propellant includes nitramine solid oxidizer and the second solid propellant excludes any nitramine solid oxidizer, wherein the first solid propellant has a composition:

| Constituent | Trade Name | Function | Nominal wt % |
|---|---|---|---|
| Flake Aluminum | Aluminum | Ballistic Modifier | ≤0.5% |
| Lead Citrate | Lead Citrate | Burn Rate Modifier | 2-5% |
| Cyclotetramethyl-enetetranitramine | HMX, <3 micron | Solid energetic/ gas generator | 45%-65% |
| Nitrocellulose | NC | Energetic Binder | 0-2% |
| Trimethylolethane trinitrate | TMETN | Energetic Plasticizer | 10-20% |
| Butanetriol trinitrate | BTTN | Energetic Plasticizer | 10-20% |
| R-18 Polyester | R-18 | Binder | 4-6% |
| Polycaprolactone | PCL | Binder | 2-4% |
| Nitrodiphenylamine | 2-NDPA | Stabilizer | 0.5%-1.0% |
| N-Methyl-P-Nitroaniline | MNA | Stabilizer | 0.5%-1.0% |
| Hexamethylene diisocyanate | HMDI | Curative | .5-2.0% | and the second solid propellant has a composition:

| Constituent | Trade Name | Function | Nominal wt % |
|---|---|---|---|
| Flake Aluminum | Aluminum | Ballistic Modifier | ≤0.5% |
| Lead Citrate | Lead Citrate | Burn Rate Modifier | 2-5% |
| Nitrotriazolone | NTO | Solid energetic/ gas generator | 45%-65% |
| Nitrocellulose | NC | Energetic Binder | 0-2% |
| Trimethylolethane trinitrate | TMETN | Energetic Plasticizer | 10-20% |
| Butanetriol trinitrate | BTTN | Energetic Plasticizer | 10-20% |
| R-18 Polyester | R-18 | Binder | 4-6% |
| Polycaprolactone | PCL | Binder | 2-4% |
| Nitrodiphenylamine | 2-NDPA | Stabilizer | 0.5%-1.0% |
| N-Methyl-P-Nitroaniline | MNA | Stabilizer | 0.5%-1.0% |
| Hexamethylene diisocyanate | HMDI | Curative | .5-2.0%. |

2. The solid rocket motor as recited in claim 1, further comprising a migration barrier between the first solid propellant and the second solid propellant.

3. The solid rocket motor as recited in claim 2, wherein the migration barrier includes a polymeric layer or a metallic layer.

4. The solid rocket motor as recited in claim 1, wherein the second solid propellant is resistant to fragment impact according to MIL-STD-2105D and NATO STANAG 4496.

5. The solid rocket motor as recited in claim 1, further comprising a motor case in which the first solid propellant and the second solid propellant are disposed, and a nozzle disposed at one end of the motor case.

6. The solid rocket motor as recited in claim 2, wherein the migration barrier includes a vinyl polymer.

7. The solid rocket motor as recited in claim 6, wherein the vinyl polymer includes a solid carbon filler.

8. The solid rocket motor as recited in claim 2, wherein the migration barrier includes aluminum.

* * * * *